C. H. MEYER.
VEHICLE.
APPLICATION FILED FEB. 18, 1911.
1,005,450.
Patented Oct. 10, 1911.
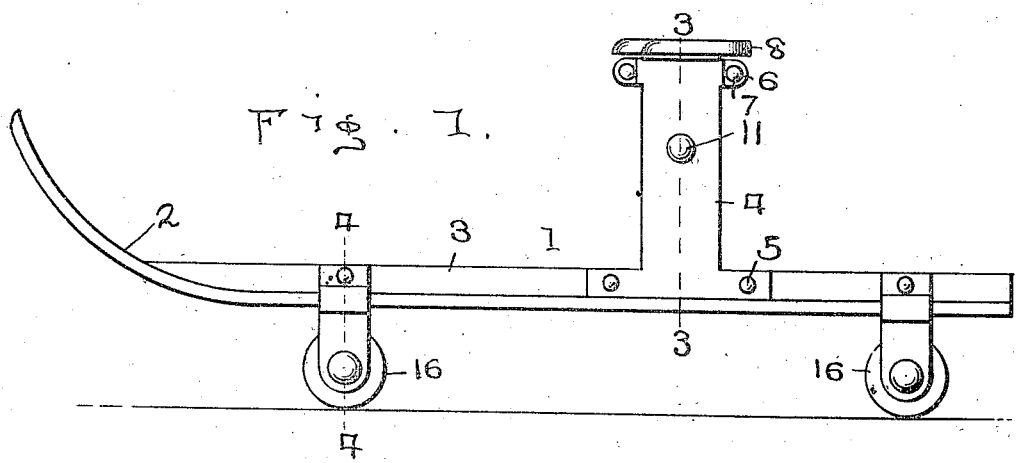
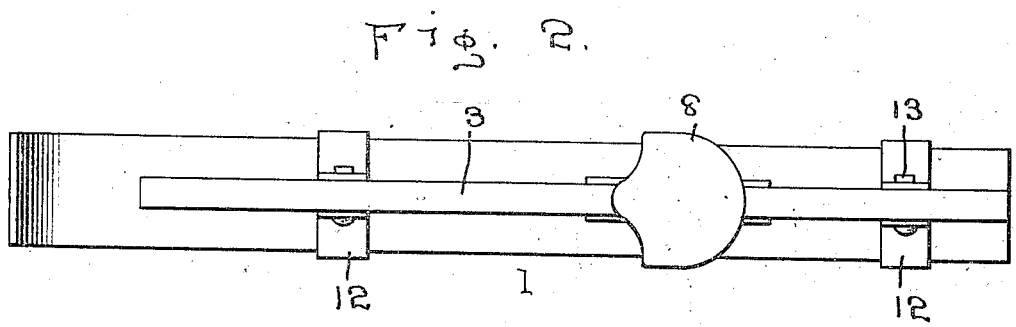
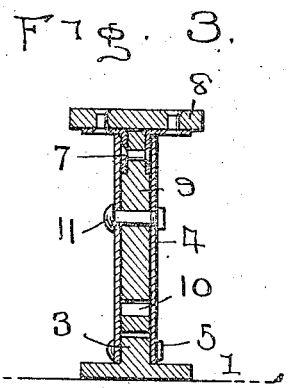
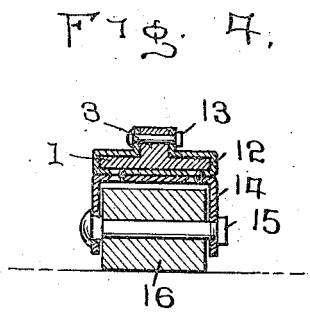
WITNESSES.
INVENTOR
C. H. Meyer
BY W. T. Fitzgerald & Co.,
Attorneys

UNITED STATES PATENT OFFICE.

CARL H. MEYER, OF WASHINGTON, PENNSYLVANIA.

VEHICLE.

1,005,450.  Specification of Letters Patent.  Patented Oct. 10, 1911.

Application filed February 18, 1911. Serial No. 609,381.

*To all whom it may concern:*

Be it known that I, CARL H. MEYER, a citizen of the United States, residing at Washington, in the county of Washington and State of Pennsylvania, have invented certain new and useful Improvements in Vehicles; and I do hereby declare the following to be a full, clear, and exact description of the invention, such as will enable others skilled in the art to which it appertains to make and use the same.

My invention relates to new and useful improvements in vehicles and more particularly to combined sleds and trucks.

The prime object of my invention is to provide a vehicle which may be readily transformed from a wheeled vehicle to a coasting sled for use upon snow or ice.

A further object of my invention is to provide means whereby wheels or rollers may be quickly and readily secured to or removed from the body of the vehicle.

Other objects and advantages of my invention will be hereinafter more clearly shown.

In the accompanying drawings I have shown the preferred forms which my invention may take.

In said drawings, Figure 1 is a side elevation of one form of my device. Fig. 2 is a top plan view thereof. Fig. 3 is a vertical sectional view through a portion of the device, as seen on line 3—3, Fig. 1. Fig. 4 is a vertical sectional view through a portion of the device as seen on line 4—4, Fig. 1.

Referring to the drawings in which similar reference numerals designate corresponding parts throughout the several views, 1 is a runner having a horizontal portion and an upturned forward end 2. Referring more particularly to Figs. 1 and 2, I provide a preferably centrally arranged longitudinal strengthening strip 3. A pair of upwardly extending standards 4 is secured to the strengthening strip 3 by bolts 5, or otherwise, as clearly shown in Fig. 3. The standards 4 are provided at their upper ends with ears 6, which are bent inwardly and then outwardly, the outer ends of said ears 6 being secured together by means of bolts 7 or by any other desired means. A seat 8, provided with a supporting standard 9, is provided for the vehicle. The support 9 is adapted to extend between the standards 4 and is preferably provided with a plurality of apertures 10, in any one of which a bolt 11 may be entered, whereby the height of the seat may be regulated.

The device heretofore set forth is adapted to be used in coasting upon snow or ice. When it is desired to use the vehicle upon other surfaces than upon snow or ice, it is desirable to employ wheels or rollers. To this end I desire to employ several different forms of supporting means for the wheels. As shown in Fig. 4, I employ a band 12, which is adapted to extend from the upper edge of one side of the supporting strip around the runner and to the upper edge of the other side of the strip 3. The band is secured in place by means of a bolt 13, which extends through the ends of the band and through the strip 3. Secured to the band 12 is an inverted substantially U-shaped supporting member 14, the free ends of said supporting member 14 being apertured to receive a bolt 15, which forms a bearing for a roller or wheel 16.

When the vehicle is supplied with wheels, as shown in Fig. 1, and it is desired to use the same for coasting upon surfaces covered with ice or snow, it is only necessary to remove the bolts 13, when the wheel supporting device may readily be removed from the runner. When the wheels are removed, no projections are left to interfere with the coasting of the sled.

It will be seen that by the construction set forth, I secure a sled, which may be used for coasting upon surfaces covered with ice or snow and which may be readily converted into a wheel or roller vehicle and used for coasting down hill in summer or winter when there is no snow or ice on the ground. It will further be seen that my invention may be very readily and cheaply constructed and that the same though formed of but few parts will be sufficiently rigid to withstand hard use. It will further be seen that I have provided a vehicle having a seat for the user, which may be readily adjusted to different heights, and, it will further be seen that the bearings will be maintained in vertical position at all times. This is accomplished in the form of my invention shown in Fig. 1 by a band 12, which extends above and beneath the runner.

What I claim is:

1. A sled comprising a runner, a central raised strengthening rib on top of the runner, parallel metal standards resting on the runner and against the sides of the rib, bolts securing the standards to the rib, a standard between the metal standards provided with a plurality of bolt holes, a bolt passing through the metal standards and a selected one of said bolt holes, angular extensions at the top of the metal standards ending in parallel vertical ears, bolts securing the ears together, horizontal flanges at the top of the metal standards, and a seat secured on said horizontal flanges.

2. A sled comprising a runner and a central strengthening rib, a metal strip encompassing the runner and bolted to the strip, an inverted U-shaped member secured under the bottom of the runner and a roller journaled in the depending sides of the U-shaped member.

3. A sled comprising a runner, a metal strip comprising a flat horizontal portion under the runner and upright ears bolted together through the runner, an inverted substantially U-shaped member comprising a flat central portion secured to the underside of the flat horizontal portion of the metal strip under the runner and vertically depending sides, and a roller journaled in said depending sides.

4. A sled comprising a runner, a raised central strengthening rib on top of the runner, a metal strip comprising a flat horizontal portion under the runner, vertical portions against each side of the runner, horizontal portions extending along the top of the runner inwardly to the sides of the rib, and vertical ears lying against the sides of the rib, bolts securing the vertical ears to the rib, an inverted substantially U-shaped member comprising a flat central portion secured to the under side of the flat horizontal portion of the metal strip under the runner, and vertically depending sides, and a roller journaled in said depending sides.

In testimony whereof I have signed my name to this specification in the presence of two subscribing witnesses.

CARL H. MEYER.

Witnesses:
 JAMES A. MAGILL,
 GRANT E. HESS.